United States Patent
Feder et al.

(10) Patent No.: US 7,450,522 B2
(45) Date of Patent: Nov. 11, 2008

(54) POWER CONTROL SYSTEM USING ACKNOWLEDGMENTS

(75) Inventors: Peretz Moshes Feder, Englewood, NJ (US); Walter Honcharenko, Monmouth Junction, NJ (US); Leonard Piazzi, Lake Hiawatha, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 138 days.

(21) Appl. No.: 11/169,919

(22) Filed: Jun. 30, 2005

(65) Prior Publication Data

US 2005/0239491 A1    Oct. 27, 2005

Related U.S. Application Data

(63) Continuation of application No. 09/306,084, filed on May 6, 1999, now abandoned.

(51) Int. Cl.
| | |
|---|---|
| G01R 31/08 | (2006.01) |
| H04L 5/12 | (2006.01) |
| H04L 1/00 | (2006.01) |
| H04L 12/26 | (2006.01) |
| G06F 11/00 | (2006.01) |
| G08C 15/00 | (2006.01) |
| H04J 1/16 | (2006.01) |
| H04J 3/14 | (2006.01) |

(52) U.S. Cl. .................................. 370/252; 370/329
(58) Field of Classification Search .................. 455/522; 370/252, 329
See application file for complete search history.

(56) References Cited

U.S. PATENT DOCUMENTS

| 5,450,616 A | * | 9/1995 | Rom ............................. 455/69 |
|---|---|---|---|
| 5,465,398 A | * | 11/1995 | Flammer ..................... 455/115 |
| 5,465,399 A | * | 11/1995 | Oberholtzer et al. .......... 455/69 |
| 5,613,228 A | * | 3/1997 | Tuttle et al. ................... 455/127 |
| 5,960,361 A | * | 9/1999 | Chen ........................... 455/522 |
| 5,995,496 A | * | 11/1999 | Honkasalo et al. ........... 370/318 |
| 6,021,311 A | * | 2/2000 | Gibson et al. ................ 340/7.22 |
| 6,028,851 A | * | 2/2000 | Persson et al. ............... 370/329 |
| 6,157,616 A | * | 12/2000 | Whitehead .................... 370/252 |
| 6,310,868 B2 | * | 10/2001 | Uebayashi et al. ........... 370/335 |
| 6,317,435 B1 | * | 11/2001 | Tiedemann et al. .......... 370/441 |

FOREIGN PATENT DOCUMENTS

| EP | 0565507 A2 | 10/1993 |
|---|---|---|
| EP | 0 917 304 | 5/1999 |
| EP | 0 917 304 A2 * | 5/1999 |
| JP | 362285532 | 12/1987 |

(Continued)

OTHER PUBLICATIONS

European Search Report dated Apr. 15, 2003.

*Primary Examiner*—William D Cumming

(57) ABSTRACT

A power control system for a wireless communications system adjusts the transmit power of a wireless transmitter in relation to a number of acknowledgments expected for radio transmissions over a wireless link. For example, a wireless unit monitors the number of acknowledgments it receives (or fails to receive) for radio packets that the wireless unit transmitted over the wireless link. The wireless unit determines the number of acknowledgments lost in relation to the number of acknowledgments expected to be received by the wireless unit. The number of acknowledgments expected by the wireless unit can be based on the number of radio packets transmitted by the wireless unit. If the number of ACKs lost/number of ACKs expected is greater than a first threshold, the wireless unit increases the transmit power level. If the number of ACKs lost/the number of ACKs expected is below a second threshold, the wireless unit decreases the transmit power level.

7 Claims, 2 Drawing Sheets

FOREIGN PATENT DOCUMENTS

| | | | | |
|---|---|---|---|---|
| JP | 362285532 A | * 12/1987 | ................ | 455/10 |
| JP | 410013338 | 1/1998 | | |
| JP | 410013338 A | * 1/1998 | | |
| WO | WO 97/49197 | 12/1997 | | |

* cited by examiner

POWER CONTROL SYSTEM USING ACKNOWLEDGMENTS

CROSS REFERENCE TO RELATED APPLICATIONS

This application is a continuation of application Ser. No. 09/306,084, filed May 6, 1999, now abandoned the entire contents of which are incorporated herein by reference.

BACKGROUND OF THE INVENTION

1. Field of the Invention

This invention relates to wireless communications and, more particularly, to a power control system for a cellular communications system which uses acknowledgments.

2. Description of Related Art

A conventional wireless cellular communications system comprises a number of cell sites or base stations, geographically distributed to support transmission and receipt of communication signals to and from cellular units, often referred to as mobile units or wireless units which may actually be stationary or fixed. Each cell site handles voice and/or data communications over a particular geographic region called a cell, and the overall coverage area for the cellular system is defined by the union of cells for all of the cell sites, where the coverage areas for nearby cell sites overlap to some degree to ensure (if possible) contiguous communications coverage within the outer boundaries of the system's coverage area.

In a wireless cellular communications system, a base station and a wireless unit communicate voice and/or data over a forward link and a reverse link, wherein the forward link carries communication signals from the base station to the wireless unit and the reverse link carries communication signals from the wireless unit to the base station. There are many different schemes for determining how wireless units and base stations communicate in a cellular communications system. For example, wireless communications links between the wireless units and the base stations can be defined according to different radio protocols, including TDMA (time-division multiple access), FDMA (frequency-division multiple access), and CDMA (code-division multiple access).

Traditional voice communications rely on communications links dedicated to the wireless unit. For example, an active wireless unit can have a dedicated forward link channel and a dedicated reverse link channel for the duration of a voice connection. Cellular communications systems based on traditional voice communications systems typically group voice and/or data information into traffic frames or radio packets defined by a certain time interval, for example 20 ms, and send the traffic frames over the dedicated communications link between the wireless unit and the base station. Certain wireless data communications systems take advantage of the bursty nature of data communications and use packet switched links to establish packet data connections for multiple wireless units sharing communications links over which radio packets are transmitted. In doing so, the wireless communications links are used more efficiently, thereby allowing increased capacity. In certain wireless data applications, a transmitting unit or station transmits radio packets to a receiving unit or station, and the transmitting unit or station waits to receive an acknowledgment signal from the receiving unit or station indicating that the receiving unit received the radio packet. If, after a period of time, the acknowledgment signal for the radio packet is not received by the transmitting unit or station, the transmitting unit or station re-transmits the radio packet.

Wireless communications systems use power control to improve system performance and increase system capacity by controlling the power levels transmitted by the wireless units and/or the base stations. Power control is generally done by the receiving unit or station measuring the signal strength from the transmitting station or unit. The receiving unit or station can adjust its transmit power based on the received signal strength, and/or the receiving unit or station can relay power control information to the transmitting unit which adjusts its transmit power level in response to the power control information. The power level transmitted by every wireless unit is typically under the control of the serving base station, and the base station performs power control to reduce the power level that each wireless unit is transmitting while maintaining a good quality reverse link. By decreasing the power level that each wireless unit is transmitting, system-wide interference created by the transmissions of the wireless units is reduced. Such a scenario allows increased capacity for the wireless cellular communications system because the overall signal to interference ratio increases for all wireless units in the wireless cellular communications system.

Power control is especially important in CDMA systems in which wireless units share the same frequency channel. If the power of each wireless unit is not controlled, stronger received signals can interfere with the weaker signals received at the base station on the same frequency channel, thereby decreasing the probability that the weaker signals will be received. Power control is provided by the base station for each wireless unit within the base station coverage area so that the signals from the wireless unit are received by the base station at the same level. As such, the nearby wireless unit does not overpower the far away wireless units.

Various power control techniques are used in CDMA wireless communications systems based on the well-known IS-95 standard. When attempting to gain access to the CDMA system, a wireless unit uses a random access procedure over an Access Channel. A power control system determines the power level to be used by the wireless unit in transmitting over the Access Channel. To determine access power, the wireless unit sends access messages over the Access Channel and receives (or fails to receive) acknowledgment signals for the access messages. After transmitting an access message at a specified power level, the wireless unit waits for an acknowledgment signal from the base station. If an acknowledgment signal is received, the sending of access messages ends and the power level of the acknowledged access message is used to set the transmit power of the wireless unit over the Access Channel. If no acknowledgment is received for the access message, the wireless unit transmits the access message at an increased power level until an acknowledgment signal is received.

On the reverse link, autonomous power control is used to establish the reverse link and react to large path loss fluctuations on the reverse link. Each wireless unit performs a signal strength measurement based on the power level of a pilot signal from the base station as well as the sum of all the base station signals received at the wireless unit. This signal strength measurement is used by the wireless unit to adjust the transmitter power of the wireless unit. The stronger the received signal, the lower the wireless unit sets its transmitter power because reception of a strong signal from the base station indicates that the wireless unit is either close or has a good path to the base station. As such, the wireless unit can use less transmitter power, thereby lowering the interference it produces for other wireless units.

Directed power control is also used on the reverse link where the base station sends power control bits to the wireless unit. In performing directed power control, the base station performs signal strength measurements, such as signal to noise ratio measurements, 16 times per 20 ms traffic frame. A traffic frame is a basic timing interval for transmitting radio frequency (RF) signals over the air. The base station sends to the wireless unit power control bits which instruct the wireless unit to increase or decrease power to approach a target signal strength measurement. The power control bits are sent 16 times per 20 ms frame, and each bit produces a 1 dB change in wireless unit power. For each consecutive frame, the target signal strength measurement is reduced a small amount, for example a value which can reduce the target signal strength measurement by 1 dB after 35 frames, until a frame error occurs. A frame error occurs when a frame (e.g., "bad frame") contains erroneous bit(s), but depending on the number of erroneous bits and the implementation, erroneous bit(s) can be corrected. When a frame error does occur, the target signal strength measurement is increased a relatively large amount, for example about 3 dB, and the base station instructs the wireless unit with power control bits to approach the target signal strength measurement.

On the forward link, lowering the power level of the base station also reduces the system-wide interference, thereby improving the signal to noise ratio for wireless units being served by other base stations. The forward link power control strategy involves the wireless unit determining the forward link Frame Error Rate (FER) over a predetermined number of frames and reporting the frame error rate measurements back to the base station. Usually, a Frame Error Rate (FER) is associated with a wireless communication system where the FER is typically defined as the ratio of bad frames to the total number of frames transmitted through a communication link between the base station and the wireless unit. Based on the FER measurements for the forward link, the base station adjusts the forward link power. For example, when a base station transmits a forward traffic frame, the wireless unit determines whether the received forward traffic frame is bad or not by performing error detection, for example using a cyclic redundancy check (CRC). The wireless unit will indicate such a determination to the base station using the error indicator bit (EIB) in the next reverse traffic frame from the wireless unit to the base station. Upon receiving reverse traffic frames from the wireless unit, the base station examines the error indicator bits. If the EIBs indicate no frame errors, the power is decreased by d (for example, ¼ dB) every 80 frames, but if the EIB indicates a frame error, the power is increased by u (for example, 1 dB) until a frame error is not indicated by an EIB bit. In an alternative embodiment, a wireless unit can send a power message report that contains the number of errored frames received and the total number of frames received during the interval covered by the report. In the alternative embodiment, if no frame error is received, the power level is decreased by d every 56 frames, but if an unacceptable number of errored frames occur during a reporting interval, the power is increased by u.

SUMMARY OF THE INVENTION

The present invention involves a power control system for a wireless communications system which adjusts the transmit power of a wireless transmitter in relation to a number of acknowledgments expected for radio transmissions transmitted over a wireless link. For example, a wireless unit monitors the number of acknowledgments it receives (or fails to receive) for radio packets that the wireless unit transmitted over the wireless link. The wireless unit determines the number of acknowledgments lost in relation to the number of acknowledgments expected to be received by the wireless unit. The number of acknowledgments expected by the wireless unit can be based on the number of radio packets transmitted by the wireless unit. If the number of ACKs lost/ number of ACKs expected is greater than a first threshold, the wireless unit increases the transmit power level. If the number of ACKs lost/the number of ACKs expected is below a second threshold, the wireless unit decreases the transmit power level.

BRIEF DESCRIPTION OF THE DRAWINGS

Other aspects and advantages of the present invention may become apparent upon reading the following detailed description and upon reference to the drawings in which.

DETAILED DESCRIPTION

Figure 1:
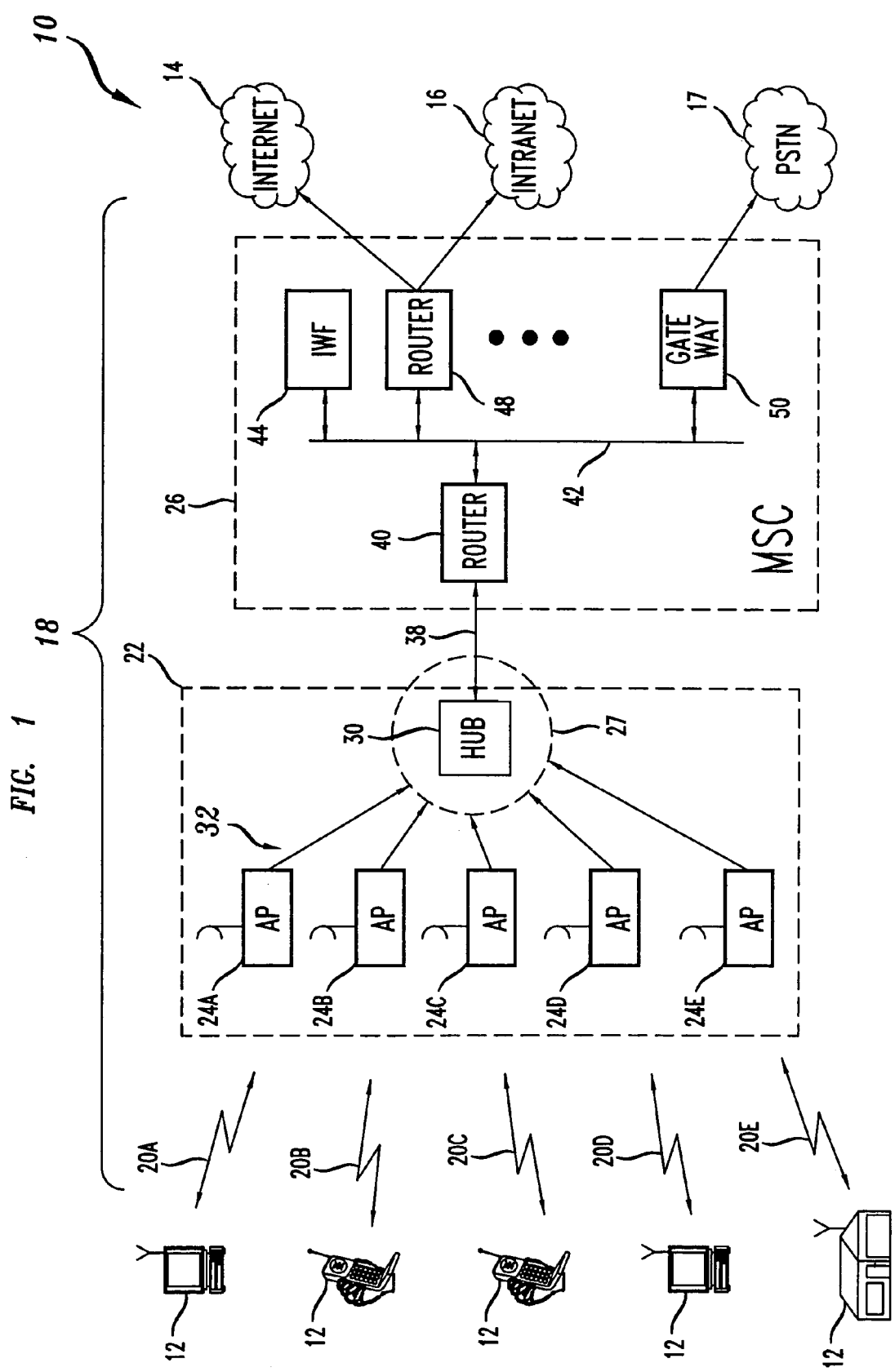
FIG. 1 shows a general diagram of a cellular communications system in which the wireless communications system according to the principles of the present invention can be used.

Illustrative embodiments of the power control system according to the principles of the present invention are described with respect to a wireless communications system 10 as shown in FIG. 1. In this embodiment, the wireless communications system 10 provides wireless units 12 with remote access to packet data networks, such as the internet 14 or private intranet 16, and/or a public switched telephone network (PSTN) 17 over a wireless network 18. The wireless units 12 connect to the wireless network 18 using external or internal wireless modems (WM) (not shown). The WMs allow the wireless units 12 to send and receive radio packets or frames, for example medium access control (MAC) frames, over a wireless link 20 to a base station 22. The base station is connected to a mobile switching center (MSC) 26 or data switch center (DSC) which provides the wireless communications system 10 with access to the packet data networks 14 and/or 16 and/or the PSTN 17, enabling a wireless unit 12 to establish a connection with the PSTN 17 and/or packet data networks 14 and/or 16. The base station 22 includes at least one access point (AP) 24 which is used to establish the wireless link 20 with the wireless unit 12. An AP includes the radio and antenna equipment used to communicate with the wireless units 12 in the geographic region or sector serviced by the AP.

In one embodiment, the power control system for the reverse link (wireless unit 12 to AP 24) is based at the wireless unit 12 and does not require control or commands from the AP 24. The power control system is based on the number of expected ACKS to be received by the wireless unit 12 from the AP 24 in response to the radio packets that were sent by the wireless unit 12. The number of radio packets transmitted by the wireless unit 12 can be the basis for the number of ACKS expected. In certain embodiment, the wireless unit 12 expects an ACK for each packet that the wireless unit 12 transmits to the AP 24. Other embodiments could send an ACK for a plurality of frames, for a variable number of frames, or for other transmissions to the AP 24 from the wireless unit 12 designated by the wireless communications system 10 as triggering an acknowledgment if received by the AP 24. Based on the number of ACKS actually received by the wireless unit 12, the number of acknowledgments lost can be determined by subtracting the number of ACKS received from the number of ACKS expected or keeping track of the mnumber of ACKs lost. From the number of acknowledgments lost, the wireless unit 12 can estimate a packet lost rate (PLR) of packets sent over the reverse link. The packet lost rate can be determined by dividing the number of ACKS lost by the number of ACKS expected or PLR=number ACKS lost/number of ACKS expected.

In certain embodiments, to provide a measurement of the lost packets and/or of the PLR, the power control system uses a sliding window of the last N expected ACKs, for example the last 100 expected ACKs. The sliding window can be implemented using a N stage ACK register or array. The N stage ACK register or array can be implemented with hardware and/or software. The size of the window can determine the power system response. If the window size is too small, the power control system threshold values will be too coarse, and the power control system can be unsteady and provide a PLR that is too high or a power level that is too high. The length of the sliding window can be predetermined, variable, periodically determined, dynamically determined, remotely configurable from the MSC 26 and/or programmable in other manners. In certain embodiments, the WM transmits a radio packet and waits a period of time, for example 20-100 ms, to detect an ACK from the AP 24. If during the period of time an ACK is received, an indication can be made in the ACK register that an expected ACK has been received. Otherwise, an indication can be made in the ACK register that an expected ACK has not been received (missed or lost ACK).

For the last N expected ACKS, the power control system can determine for the WM the packet lost rate (PLR) as the number of lost ACKs/expected ACKs. If the number of lost ACKs/number of expected ACKs is above a first threshold, for example 5%, the power control system can increase the transmit power of the wireless unit 12. If the number of lost ACKs/number of expected ACKs is below a second threshold, for example 1%, the power control system can decrease the transmit power of the wireless unit 12. The first and/or second thresholds can be predetermined, variable, periodically determined, dynamically determined, remotely configurable from the MSC 26 and/or programmable in other manners. The first and second thresholds can be the same threshold value. As such, the power control system can use one threshold in determining whether to increase or decrease power. Thus, the power control system can operate at the wireless unit to maintain a wireless link 20 at an acceptable quality while reducing the interference produced by the wireless unit 12 to other wireless units 12.

The power control system has been described as being implemented at the wireless unit 12 to control the power level of the wireless unit 12 on the reverse link. To do so, the power control system can be implemented in an internal or external WM for the wireless unit 12. The external WMs can attach to the wireless unit 12 via a wired or wireless link and can be co-located with a rooftop mounted directional antenna. The internal modem can be in the form of a PC (personal computer) Card inserted into a PC Card socket as defined by the Personal Computer Memory Card International Association (PCMCIA) and the Japan Electronic Industry Development Association (JEIDA) or incorporated into the circuitry of the wireless unit 12, such as a cellular phone or personal wireless device. Alternative embodiments of the power control system can be used to control the power level used by the AP 24 to transmit on the forward link. Such a power control system or portions thereof can be implemented in the AP 24, the base station 22 and/or an MSC 26.

In the embodiment of FIG. 1, the base station 22 is shown with five (5) access points (APs) 24a-e. Each AP 24a-e is responsible for a sector and communicates with those wireless units 12a-e in the sector using a full division duplex scheme in which each AP 24a-e uses one (1) carrier for the forward link and one (1) carrier for the reverse link. Additionally, communications between the wireless units 12a-e and the AP 24a-e can be scheduled using a round-robin scheme, a first come-first served basis or a priority basis. The base station 22 can use a 5-channel reuse communication 1 scheme as described in U.S. patent application Ser. No. 08/998,505 filed on Dec. 26, 1997 in which a base station covers a geographic area divided into 5 sectors, and a different frequency carrier is used in each sector. Different channel and multiple access techniques can be used.

The base station 22 multiplexes wireless unit traffic from the coverage area to a mobile switching center (MSC) 26 over a back haul network 27. In this embodiment, the base station 22 includes an access hub 30 as part of the backhaul network 27 which serves the five APs 24. The hub 30 is linked to the APs 24 via link(s) 32, such as a Institute of Electrical and Electronics Engineers (IEEE) 802.3 local area network (LAN) or local T1 link. Other links are possible, and the hub 30 2 need not be co-located at the base station 22 with the APs 24. The hub 30 can be linked with the MSC 26 using a wireless, wireline or optical link 38, for example using transport control protocol (TCP)/Internet Protocol (IP) over asynchronous transfer mode (ATM), frame relay or T1 lines, to a router 40 at the MSC 26. At the MSC 26, the router 40 routes the traffic over an Interconnect LAN/ATM 42 in this embodiment. An inter-working function (IWF) 44 terminates the wireless protocols for the wireless network 18 and provides an interface with the internet 14 or intranet 16. A router 48 connects the MSC 26 to the internet 14 or a private intranet 16. A gateway 50 provides access to the PSTN 17. The power control system for the forward link or portions thereof can be implemented throughout the wireless network 18.

Figure 2:
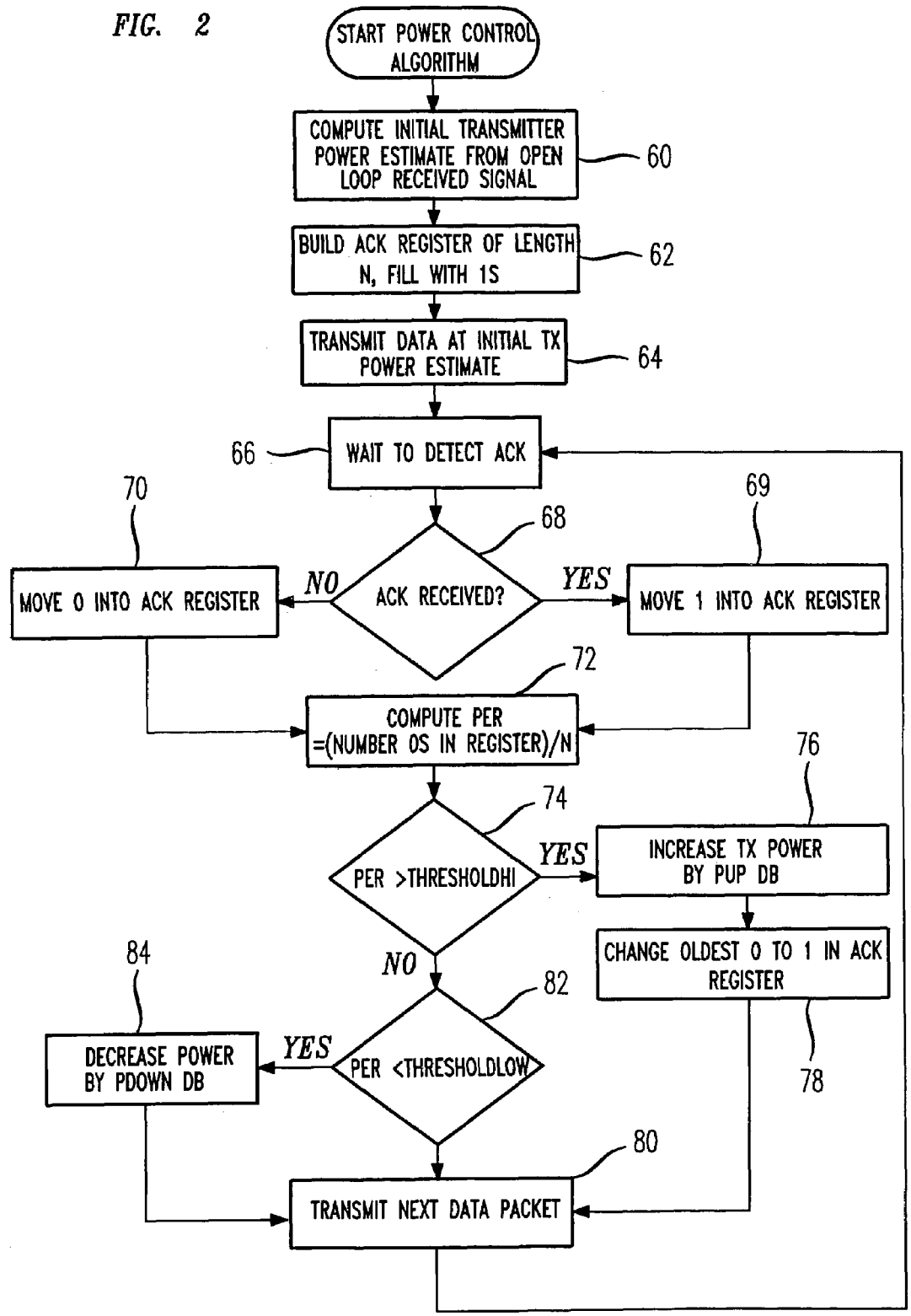
FIG. 2 shows a flow diagram of an embodiment of the power control system using the principles of the present invention.

FIG. 2 shows a general flow diagram for the power control system. At step 60, the power control system computes the initial transmitter power level using an open loop received signal. In one embodiment, when a wireless unit powers up, the WM attempts to associate or synchronize to a beacon signal transmitted by the APs 24. The AP 24 can advertise its transmitted power level in the beacon signal. The WM calculates the transmitter power P_TX based on the power level advertised in the beacon signal according to P _TX=AP(advertised power)−SNR Rx−P TX margin, where AP (advertised power) is the transmit power of the AP, SNR RX is the received signal to noise ratio (SNR) at the WM of the beacon signals sent by the AP 24, and P TXMargin is a programmable margin to transmit at a power level below AP (advertised power)−SNR Rx.

To associate with the AP 24, the WM can transmit association requests at P _TX until the AP 24 sends an ACK of association and time synchronization. In on embodiment, if the association request is not acknowledged by the AP 24, the WM increases the transmit power, for example by 2 dB, for each attempt and continues until reaching a configurable parameter Max Assoc Req which represents the maximum allowable association requests without receiving back an ACK. Alternatively, the WM can transmit association requests at maximum power 2 until the AP 24 sends an ACK of association and time synchronization. After the wireless unit 12 receives the association ACK from the AP 24 or until power information is obtained from a beacon signal, the WM can establish transmitter power as P _TX=Max TX power−SNR Rx−P _TX margin, where Max TX power is the maximum transmit power or maximum link budget, for example 100-140 dBm, of the WM based on the cell size definitions and cell planning, SNR Rx is the signal to noise ratio of for example the received ACK from the AP 24) and P-TX margin is a programmable margin to transmit at a power level below Max IX power-SNR Rx. Other embodiments are possible for associating with and establishing an initial transmit power in transmitting to the AP 24 in which different signal strength measurements, parameters, signals and/or processes are used.

Once associated with the AP 24, the WM can monitor the number of ACKs received and/or lost from the AP 24 in relation to the number of ACKs expected from the AP 24 based on the number of radio packets transmitted or other transmission to the AP 24 from the wireless unit 12 designated by the wireless communications system 10 as triggering an acknowledgment if received by the AP 24. If the number of missed ACKs (those expected but not received)/expected number of ACKs is greater than a first threshold, the WM increases the transmit power. If the number of lost or missed ACKs/expected number of ACKs is less than a second threshold, the 1 WM can decrease the transmit power. Alternatively, the first and second threshold values can be the same value whereby the power control system uses a single threshold value or more than two threshold values, where in between the thresholds, the increase or decrease in power changes. Additionally, the ratio of the number of missed ACKs/the number of expected ACKs can be defined in terms of the number of ACKs received/number of expected ACKs. As such, the thresholds are defined in terms of % of packets acknowledged. In such a case, if the number of received ACKs/expected number of ACKs is greater than a first threshold, the WM decreases the transmit power. If the number of received ACKs/expected number of ACKs is less than a second threshold, the WM can increase the transmit power.

In this embodiment, an ACK register, such as a shift register, of length N is provided or established and filled with 1's at step 62. The WM transmits a radio packet at the initial transmit power at step 64. At step 66, the WM waits a period of time which can be configurable, for example from 20 ms-100 ms, to detect an ACK from the AP 24. If during the period of time an ACK is received as determined at step 68, a one (1) is placed in the ACK register at step 69 to represent a received ACK. Otherwise, a zero (0) is moved into the ACK register at step 70 to represent a missed ACK. At step 72, the power control system determines for the WM the packet lost rate (PLR) as the number of zeroes in the ACK register 1 N.

At step 74, the power control system determines if the PLR is greater than the high threshold, for example 5%. If so, at step 76, the power control system increases the transmit power by Pup dB, for example 2 dB. Then, at step 78, the power control system changes the oldest 0 to 1 in the ACK register. Changing the oldest 0 to 1 is done to ensure that the ACK register does not maintain extra zeroes which will force the TX power to continue ramping up even though subsequent ACKs are received. Afterward, the WM transmits the next radio packet at step 80, and the power control system proceeds back to step 66 and waits for an ACK as described above.

If at step 74 the power control system determines that the PLR is less than the high threshold, the power control system determines at step 82 whether the PLR is less than a low threshold, for example 1%. If so, the power control system decreases the power by $P_{down}$, for example 2 dB, at step 84. The WM transmits the next radio packet at step 80 and returns to step 66 to wait for an ACK as described above. If at step 82, the power control system determines that the PLR is greater than the low threshold, which means low threshold<PLR<high threshold, the WM transmits the next packet at step 80 and returns to step 66 to wait for the corresponding ACK. If at step 66, an ACK is not received after an appropriate time period, the WM can re-transmit the radio packet. Depending on the application, the WM can transmit a subsequent radio packet before receiving the ACK of a previous radio packet. In any event, by maintaining the PLR between the high and low thresholds, the PLR can be kept low, but not so low that the power level of the transmitting unit or station introduces unacceptable levels of interference into the system.

In addition to the embodiments described above, the power control system according to the principles of the present invention has been described with a particular system, but the power control system can be used with different cellular systems and configurations which omit and/or add components and/or use variations or portions of the described system. For example, the power control system has been described with particular reference to a wireless unit which has established a reverse link with a base station using a particular base station configuration and wireless architecture, but other wireless systems using different multiple access techniques, such as CDMA, time division multiple access (TDMA) can be used and systems for sending data and/or voice. Additionally, the terms transmitter, transceiver and/or receiver and related terms can be used to refer to both the wireless unit or the base station side of the wireless network and/or portions of the wireless communications system. As such, the power control system can be implemented on the base station side of the wireless communications system to control the transmit power of the base station on the forward link with a wireless unit 12 as well as at the wireless unit 12 to control the transmit power on the reverse link.

It should be understood that different notations, references and characterizations of the various architecture blocks can be used. For example, the wireless system is described using a base station with APs connected through a network to an MSC including routers and/or a gateway, but the power control system can be utilized in wireless voice and/or data systems with different architectures using different notations and/or different functional blocks. Additionally, the power control system using acknowledgments can be incorporated as part of a larger power control system. For example, an embodiment of the power control system can be used to set a target threshold, such as a signal strength measurement, a frame error rate or other received signal measurement, used in adjusting the transmit power of the wireless transmitter. The power control system is described as using first and second thresholds, but additional thresholds, for example based on overall system interference, signal strength measurements, BER, FER or other measurements, and/or different thresholds, for example based on the number or percentage of lost or received ACKs, can be used to control or limit the transmit power of the transmitting unit. Moreover, the power control system can be used with wireless communications systems transmitting voice and/or data using radio packets or traffic frames which can be sent over dedicated wireless links or shared wireless links.

Furthermore, a particular implementation for the power control system has been described using a register or array to monitor the number of lost acknowledgments the system, but other implementations are possible and can be used to perform power control based on the number(s) of or percentage of lost or received acknowledgments. The various parameters and/or variables used in the power control system can be predetermined, variable, periodically determined, dynamically determined, remotely configurable from the MSC 26 and/or programmable in other manners. The power control system, the described architecture and/or portions thereof can be implemented in different locations or in application specific integrated circuits, software-driven processing circuitry, firmware or other arrangements of components as would be understood by one of ordinary skill in the art with the benefit of this disclosure. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

The invention claimed is:

1. The method of adjusting transmit power over a wireless link, said method comprising:
   adjusting a transmit power of a wireless transmitter for radio transmissions over said wireless link in relation to a number N of expected ACKs and a number of ACKs lost, the lost ACK being an ACK not received as expected, wherein said adjusting being performed by said wireless transmitter and further including:
   monitoring the number of ACKs lost for radio packets transmitted;
   increasing said transmit power if the number of ACKs lost/expected number of ACKs is above a first threshold; and
   decreasing said transmit power if the number of ACKs lost/expected number of ACKs is below a second threshold.

2. The method of claim 1 further including:
   determining an initial transmit power for said wireless transmitter based on a measurement of a signal received over said wireless link.

3. The method of claim 1 further including:
   transmitting acknowledgments of radio packets transmitted by said wireless transmitter over said wireless link to said base station.

4. The method of claim 1 further including:
   transmitting acknowledgments of radio packets transmitted by said wireless transmitter over said wireless link to said wireless unit.

5. The method of adjusting transmit power over a wireless link, said method comprising:
   adjusting a transmit power of a wireless transmitter for radio transmissions over said wireless link in relation to a number N of expected ACKs and a number of ACKs lost, the lost ACK being an ACK not received as expected;
   filling a register of length N with bits representing ACKs and bits representing ACKs lost, the bits representing ACKs being receive bits and the bits representing ACKs lost being no ACK bits;
   transmitting a radio packet;
   inserting into said register a receive ACK bit if an ACK was received within a time interval; and
   inserting into said register a no ACK bit if an ACK was not received within said time interval.

6. The method of claim 5 wherein said step of adjusting including:
   reducing said transmit power if the number of no ACK bits/N is less than a first threshold; and
   increasing said transmit power if the number of no ACK bits/N is greater than a second threshold.

7. The method of claim 5 further including:
   determining an initial transmit power for said wireless transmitter based on a measurement of a signal received over said wireless link.

* * * * *